Dec. 31, 1968     M. E. NANTZ     3,418,847
MOMENTS OF INERTIA PLATFORM

Filed June 17, 1966     Sheet 1 of 3

INVENTOR.
MERLE E. NANTZ
BY
ATTORNEYS

INVENTOR.
MERLE E. NANTZ
BY Harry P. Herbert Jr
Ruth Cordier
ATTORNEYS

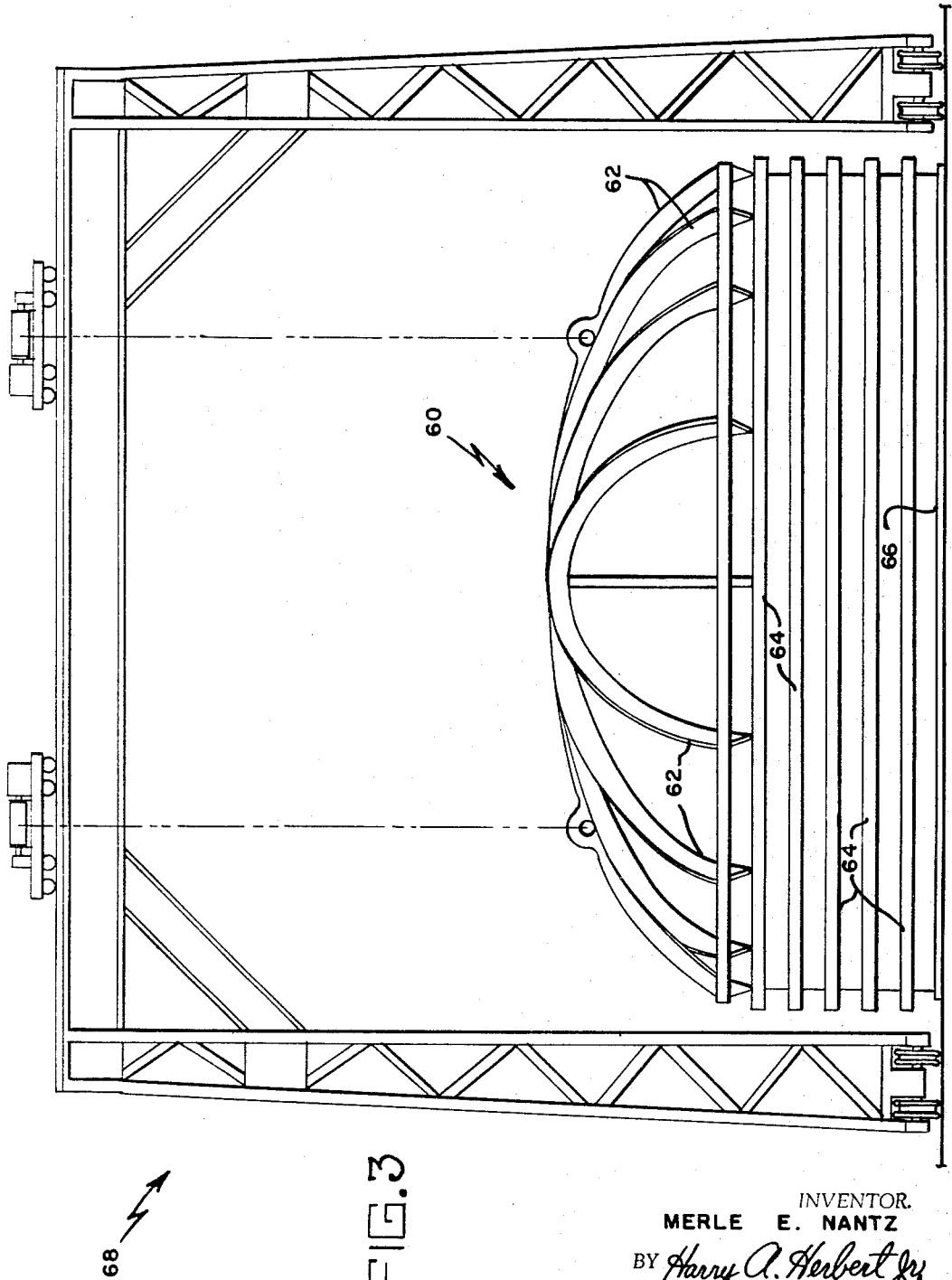

United States Patent Office 3,418,847
Patented Dec. 31, 1968

3,418,847
MOMENTS OF INERTIA PLATFORM
Merle E. Nantz, Sun City, Calif., assignor to the United States of America as represented by the Secretary of the Air Force
Filed June 17, 1966, Ser. No. 559,353
7 Claims. (Cl. 73—65)

ABSTRACT OF THE DISCLOSURE

A ground level platform onto which an aircraft may be rolled; pivot means with associated jacks located below ground level whereby the platform may be lifted and then lowered to rest on selected knife edge fulcra. Moments of inertia of an aircraft may then be determined about any of the three mutually perpendicular axes. This is done with one placement of the aircraft.

Figure 1:
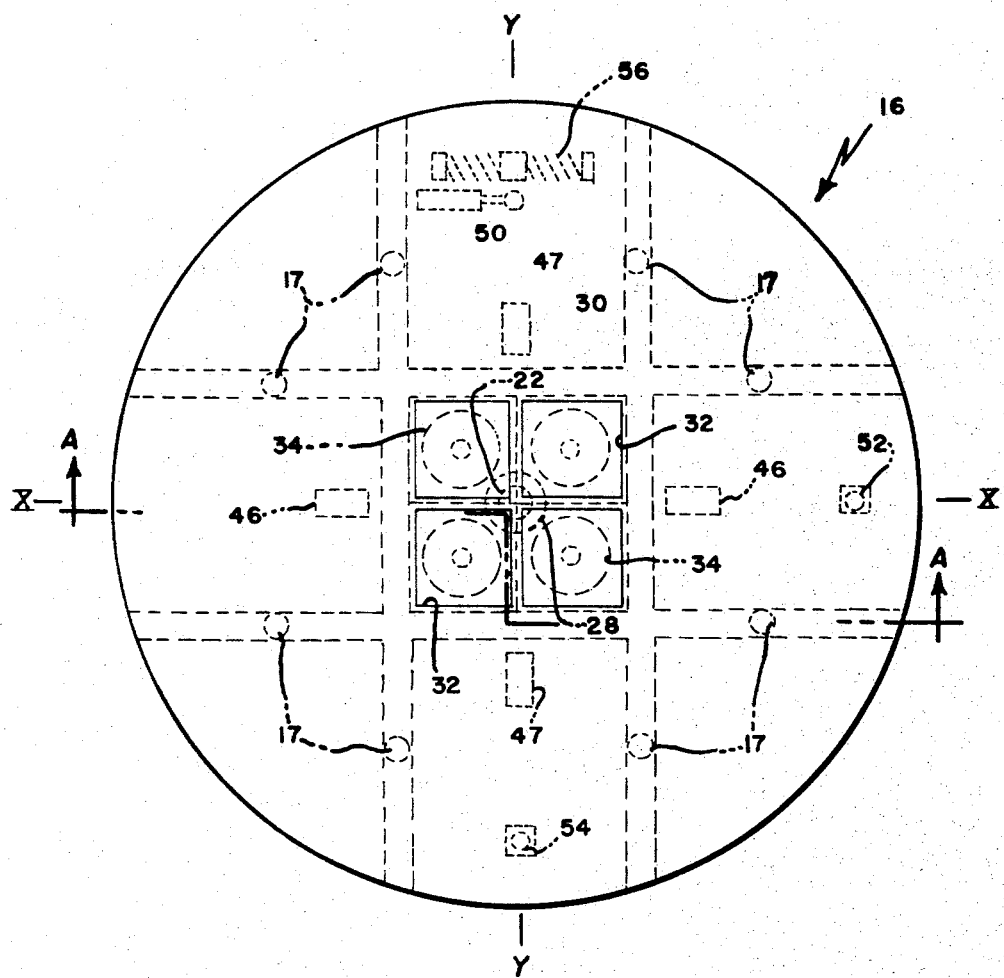

The invention described herein may be manufactured and used by or for the United States Government for govermental purposes without payment to me of any royalty thereon.

The present invention relates to a device for determining the moments of inertia of a body with reference to three orthogonal axes, and more particularly to a platform capable of pendulum movement about fulcra located below the platform for inertial measurements during roll, pitch and yaw of bodies such as air or spacecraft.

There are certain inadequacies inherent in devices presently available for making this sort of determination. For example, these systems are insufficiently precise for making measurements of aircraft having moments of inertia less than magnitudes of the order of 250,000 slug-feet squared. All causes of this imprecision are not definitely known, but it is known that accuracy and consistency of the measurements are affected by temperature conditions and by air drafts.

Furthermore, the platforms now available fail to rigorously maintain the location of the center of oscillation. This is due in part to the spherical sector type bearings used in these platforms, and because the center of oscillation is above the floor instead of below it.

Strains occur in the platform structure due to stresses and temperature changes. Deflections of the bearing pedestals and of the foundation as well contribute to errors in the determinations sought.

Mounting of supports for test bodies above the platform lead to stress and obstructions. Hazardous conditions arise especially where spring oscillation methods are being used.

The present invention seeks to overcome these difficulties, while maintaining the desirable qualities of the devices now in use. In the present invention the axes of oscillation are definitely and mechanically established by means of systems of fulcra having knife edge bearings or other conventional low friction bearings.

The principle involved is basically a platform operating as a pendulum and supplied with at least three fulcrum systems, located below the level of the platform about which the pendulum may oscillate. The natural period of oscillation of the combined platform and test body is determined in any of the three modes of oscillation, each of which is provided for by one of the fulcrum systems. Moments of inertia of the body are computed from the observed periods of oscillation and from information concerning the period of oscillation of the pendulum without the test body. This may be described as the "tare" moment of inertia.

One of the objects of the invention is the provision of a device wherein the moments of inertia in roll, pitch and yaw of the body under test can be made rapidly and accurately with one placement of the craft being tested, and wherein the craft or body being tested is supported by supporting structures located on the platform, around the craft and not above it, alleviating the problems involved and the hazardous conditions prevalent when the craft is supported by suspending elements located above the craft.

A further object of the invention is to provide a pendulum platform for performing the purposes above stated and wherein the three fulcrum systems of the pendulum are located below the platform and wherein means are provided for transferring the weight of the platform from one set of fulcra to another.

A still further object of the invention is the provision of the device as above mentioned wherein all platform supports and all weight transferring devices are located below the level of the platform.

Another object of the invention is the provision of a device wherein the transfer of the weight of the platform from one fulcrum system to another is made by the manipulation of supporting jacks, synchronized and remotely controlled so that one placement of the test craft is all that is necessary for inertial determinations in any chosen mode of roll, pitch or yaw.

Since measurements of moments of inertia made in the atmosphere are affected by "additional mass" effects caused by boundary pressures, buoyancy, entrapped air, etc. on the oscillating craft, corrections have to be made for estimated atmospheric effects.

There is considerable engineering judgment and labor involved in making these corrections, together with uncertainties and inaccuracies. Furthermore, in spacecraft operations the prevalent conditions are more nearly analogous to vacuum conditions.

The present invention seeks to provide a device where determination of moments of inertia are made in vacuum under reduced pressure, or at the least in a controlled and protected atmosphere.

Figure 2:
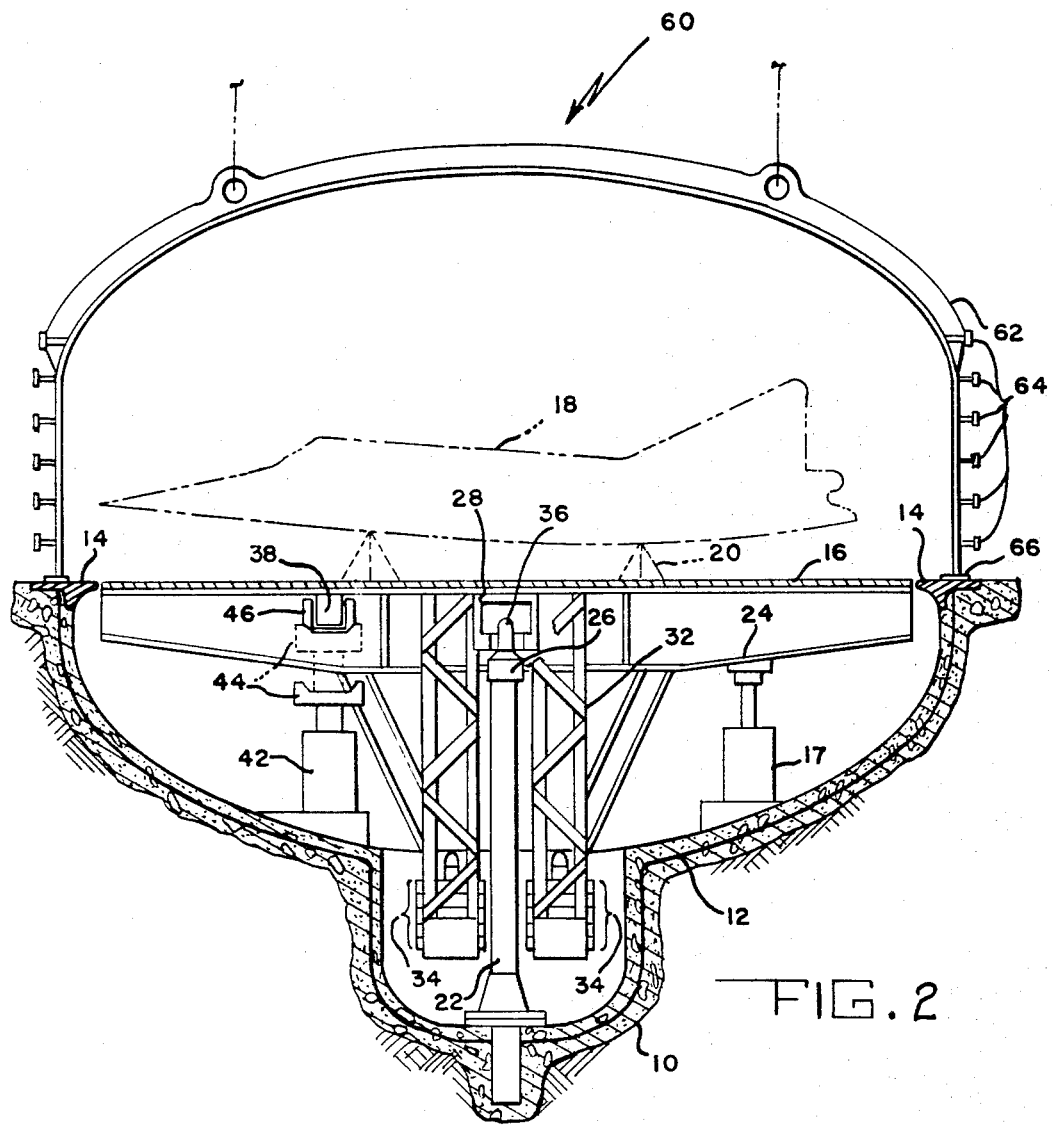
Figure 4:
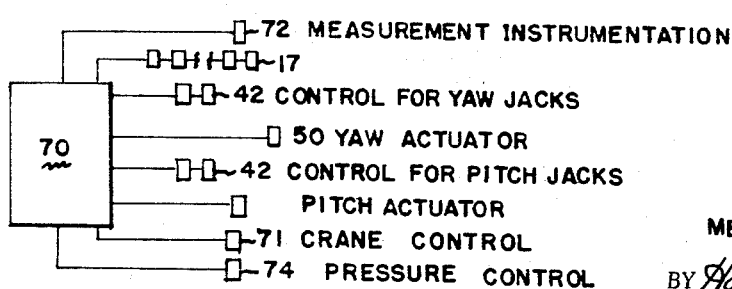

These and other advantages, features and objects of the invention will become more apparent from the following description taken in connection with the illustrative embodiments in the accompanying drawings, wherein:

FIG. 1 is a plan view of the system of this invention;
FIG. 2 is a vertical cross-sectional view of the device, taken on the line A—A of FIG. 1;
FIG. 3 is an elevational view of the dome covering the platform and the crane for moving and proper positioning of the dome; and
FIG. 4 is a schematic view indicating the remote control and synchronization system.

Referring more in detail to the drawings, a bowl-shaped excavated area is provided with a reinforced concrete lining such as is shown at 10 in FIG. 2. If determinations are to be made with reduced pressure or in vacuum, an airtight steel membrane shown in dotted lines at 12 is incorporated in the concrete, and means 14 for effecting a seal are provided.

Platform 16 is normally supported at ground, or apron, or floor level, depending upon its established environment, by means of a system of synchronized or remotely controlled jacks 17 (see FIG. 2) so that the test craft 18 shown in dotted lines in FIG. 2 may be wheeled onto the platform and anchored in place by suitable anchoring means indicated at 20. Eight jacks 17 are shown. The invention is not limited to any specific number of supporting jacks. It will be noted that the anchoring and supporting means 20 are located below and around the craft and not above it.

A hatch 30 gives access to counter weight frames 32 attached to and depending from the platform 16 and capable of yaw movement with it. Four such frames are shown, but the invention is not limited to this specific number. Weight elements 34 are added or removed as necessary to establish the center of mass of the combined platform and testcraft at a point beneath all of the fulcra, thereby providing stability.

The three fulcrum systems which allow oscillation of the platform in the three modes of yaw, pitch and roll are the central pintle 22 and two sets of knife edges or other low friction bearings 38.

The yaw system comprises the central staff or yaw pintle 22 supported at its base in the center of the concrete bowl 10. A pivot bearing housing 28 is attached to the under portion of the platform and depends therefrom.

When the platform is in position for operation in the yaw mode, the weight of the platform is carried on the single contact of the bearing element 36 located at its top, and the yaw pivot bearing 28.

This condition is achieved when all supporting jacks are lowered sufficiently to allow this contact.

The second and third fulcrum systems for roll and pitch movement comprise two additional pairs of jacks 42, each provided with a cradle bracket 44, adapted to contact and support the fulcrum brackets 46.

Two pairs of knife edge or other low friction bearings, one of which is shown at 38 in FIG. 2, are supported in U-members or fulcrum units 46 and 47 in contact with the underside of the platform. The two members of each pair are aligned on a diameter of the platform, and the two pair are located on normal diameters for supporting the platform for roll and pitch movement. Each pair can serve either as roll fulcra or as pitch fulcra depending upon the placement of the test craft on the platform 16.

Actuators are provided for initiating the movement desired. A yaw actuator is shown at 50 and pitch and roll actuators are shown at 52 and 54. These are remotely controlled and may be hydraulic or of any other standard or expedient design. Restoring means are also provided for controlling the roll, pitch and yaw movement, the moments of inertia being determined by the period of the pendulum movement. By way of example, a yaw spring 56, located below the platform, is indicated in FIG. 1.

The construction to provide a chamber wherein a controlled atmosphere around the platform 16 can be achieved includes the bowl-shaped area, concrete lined at 10 and having the air-tight steel membrane 12 and seal 14.

A dome 60 is provided with suitable reinforcement 62 and 64 to make it resistant to collapse under external atmospheric pressure. A seal 66 makes contact with the seal 14 to insure an air-tight joint so that the pressure within the enclosed area may be controlled. Vacuum pumps (not shown) control the pressure within the enclosed area for creating and maintaining the desired pressure within the chamber. This equipment is subject to remote control.

A gantry crane 68 suspends the dome 60 placing it and removing it. It will be useful also for handling of other equipment such as weights, aircraft supports, etc.

The movement of the crane is subject to remote control (see FIG. 4) as are the platform support jacks and the actuators.

The remote control, synchronization and performance measurement station 70 is shown schematically in FIG. 4. Instrumentation for taking measurements is shown schematically at 72 (FIG. 4).

The operation of the platform is as follows:

(1) With the platform 16 supported by jacks 17 so that the floor is flush with an approach apron, an aircraft 18 or other item to be tested is moved into place and securely supported from the floor.

(2) If tests are to be made in vacuum or under reduced pressures, or under protected conditions of any kind, the dome 60 is maneuvered into place by the crane 36, an air-tight joints is effected by contact of the seals 14 and 66 and pressure within the area is reduced by pumps indicated schematically at 72 in FIG. 4.

(3) Specialized jacks 44, supported by columns 42, are elevated into contact with one set of the two fulcrum units (say, those for pitch oscillation) so that the weight of the platform is carried through those units.

(4) The platform jacks 17 are lowered to provide contact with the chosen fulcrum unit and for clearance needed for platform oscillation.

(5) A suitable remotely controlled actuator 50 initiates free oscillation of the platform in the pitch mode, and measurements of period are made for eventual reduction to moment of inertia values in pitch.

(6) By a jacking operation of the fulcrum supports, the platform weight is transferred from the pitch fulcra to the roll fulcra and measurements are made of the period of oscillation in the roll mode, in a manner similar to that for the pitch mode, described above.

(7) The platform is lowered by the supporting jacks until the yaw pivot bearing and the guide bearing come into position on the yaw pintle 22.

(8) Yaw springs 56 are brought into place, preferably by remotely controlled actuators.

(9) Yaw oscillation is initiated by an actuator 50 and the period is measured.

(10) Upon completion of measurements with the test craft 18 in place, the platform 18 is jacked up by jacks 17 until the platform floor is flush with the apron and the craft is removed.

I claim:

1. A device for the measurement severally of moments of inertia in three modes of roll, pitch and yaw with one setting of the test specimen, said device comprising a pendulum platform, three sets of fulcra for said platform, each set being located below the level of said platform, means for transferring the weight of said platform to a selected set of fulcra for making inertial determinations in a selected mode, said three sets of fulcra comprising (1) a central pintle and a pivot bearing for supporting said platform for allowing yaw pendulum movement of said platform (2) a pair of knife edge bearing supports axially placed with reference to the test specimen and below said platform for allowing roll movement of said platform (3) knife edge bearing supports transversely placed with reference to the test specimen for allowing pitch movement of said platform.

2. A device according to claim 1, wherein said means for transferring the weight of said platform comprise remotely controlled systems of synchronized jacks.

3. In a device according to claim 1, a separate means for actuating said platform in the mode chosen, and means for controlling and measuring the movement initiated.

4. A device for the measurement severally of moments of inertia in three modes of roll, pitch and yaw with one setting of the test specimen, said device comprising a pendulum platform, three sets of fulcra for said platform, each set being located below the level of said platform, means for transferring the weight of said platform to a selected set of fulcra for making inertial determinations in a selected mode, a set of jacks, synchronized and remotely controlled for selectively providing support for said platform at apron level so that a test specimen may be wheeled onto said platform, and alternatively for withdrawing said support so that said platform is supported on selected bearing supports for oscillation in a selected mode, and jack means for elevation and contact with the bearings of the mode selected.

5. In a device as claimed in claim 1, sets of jacks, synchronized and remotely controlled for selectively providing support for said platform and alternatively withdrawing said support, for transferring the weight of said platform, a pair of low friction bearings secured to the underneath portion of said platform, said jacks being located beneath each of said low friction bearings for selectively contacting and supporting said bearings for support of said platform in the roll mode, a pair of pitch bearings located when supported, to provide roll operation of said platform and jacks located beneath said pitch bearings to contact said bearings and support said platform for operation in the pitch mode and a single central bearing for supporting said platform for operation in the yaw mode.

6. A device for measurement severally of moments of inertia of a body such as air/space craft in three modes of roll, pitch and yaw, in one setting of said body, said device comprising a platform operating with said test craft as a pendulum in a selected one of three modes of roll, pitch and yaw, synchronized and remotely controlled jack means for supporting said platform at apron level so that the craft to be tested may be wheeled thereon, three fulcrum systems each located below said platform for individually supporting said platform for pendulum movement in the mode selected, means for transferring the weight of said platform to the selected fulcra.

7. A device as claimed in claim 6, wherein said three fulcrum systems comprise the following: (1) a centrally located single bearing upon which said platform may be centrally supported for yaw movements (2) a pair of low friction bearings located on a diameter of said platform and (3) a second pair of low friction bearings located on a diameter normal to the first mentioned diameter, said second and third mentioned bearings being capable of engagement with supporting means, and pairs of jacks synchronized and remotely controlled for severally supporting said pairs of low friction bearings for selected roll and pitch pendulum movement of said platform and the test craft placed thereon.

References Cited

UNITED STATES PATENTS

| | | | |
|---|---|---|---|
| 2,766,624 | 10/1956 | Heffner | 73—432 |
| 3,040,563 | 6/1962 | Eckles et al. | 73—65 |
| 3,031,878 | 5/1962 | Welch | 73—1 |
| 3,156,108 | 10/1964 | Rudderow | 73—1 |
| 3,224,277 | 12/1965 | Chamberlin et al. | 73—432 |

RICHARD C. QUEISSER, *Primary Examiner.*

H. GOLDSTEIN, *Assistant Examiner.*